(12) United States Patent
Hebert

(10) Patent No.: US 6,936,172 B2
(45) Date of Patent: Aug. 30, 2005

(54) CATALYTIC TREATMENT OF HARD WATER IN A REVERSE OSMOSIS SYSTEM

(76) Inventor: L. Claude Hebert, 340 Mortagne Blvd, Boucherville, Quebec (CA), J4B 1B5

( * ) Notice: Subject to any disclaimer, the term of this patent is extended or adjusted under 35 U.S.C. 154(b) by 292 days.

(21) Appl. No.: 10/351,809

(22) Filed: Jan. 24, 2003

(65) Prior Publication Data

US 2004/0144707 A1 Jul. 29, 2004

(51) Int. Cl.⁷ .......................... B01D 61/00; C02F 1/48; C02F 9/00
(52) U.S. Cl. ................ 210/652; 210/695; 210/805; 210/806; 210/195.2; 210/223; 210/257.2; 210/259; 210/295; 210/321.6; 210/416.1
(58) Field of Search .................. 210/652, 695, 210/805, 195.2, 223, 257.2, 259, 321.6, 416.1, 806, 295

(56) References Cited

U.S. PATENT DOCUMENTS

| | | | | | |
|---|---|---|---|---|---|
| 4,167,480 | A | * | 9/1979 | Mach | 210/223 |
| 5,234,583 | A | * | 8/1993 | Cluff | 210/223 |
| 6,030,535 | A | * | 2/2000 | Hayashi et al. | 210/223 |
| 2003/0196955 | A1 | * | 10/2003 | Hughes | 210/805 |

* cited by examiner

*Primary Examiner*—David A. Reifsnyder
(74) *Attorney, Agent, or Firm*—Eric Fincham

(57) ABSTRACT

A water treatment system which comprises a reverse osmosis device having a fluid inlet, a permeate outlet and a concentrate outlet with a pump to pump a fluid through the reverse osmosis device, and a magnetic treatment device situated upstream of the fluid inlet, and filter means arranged to filter fluid from the concentrate outlet prior to recycling the fluid upstream of the magnetic treatment device. When a plurality of passes, the system reduces membrane fouling as the crystal structure of the precipitate is changed to reduce the amount of calcite to a deposit which precipitates mostly as aragonite.

5 Claims, 11 Drawing Sheets

CATALYTIC TREATMENT OF HARD WATER IN A REVERSE OSMOSIS SYSTEM

FIELD OF THE INVENTION

The present invention relates to water treatment and more particularly, relates to cross flow membrane technology used in ultra filtration and reverse osmosis devices.

BACKGROUND OF THE INVENTION

The use of reverse osmosis devices to remove contaminants from water is well established in the art and many such devices exist. Originally used primarily in the industry, smaller and smaller devices are being developed and are now suitable for use in residential applications. Indeed, there is an increased demand for such residential devices as concern with the purity of residential water increases.

One of the major concerns with the use of reverse osmosis devices is the percentage of water that is sent to the drain and the fouling of the membrane of the reverse osmosis system.

Hard water is always a problem for industry due to rapid scaling of pipes and conduits. In order to overcome this problem, different solutions have been offered. Among these, the reverse osmosis systems are increasingly being used. However, this to a certain extent transfers the problem to a problem of the fouling of the membranes. Traditional pre-treatments have included acidification, ion resin exchange, and the use of sequestrants.

Using acidification, an acid is employed to acidify the hard water to reduce the calcium and metal oxide deposits at the surface of the membrane. Using an ion resin exchange softens the water which permits a reduction of the hardness by an exchange between the sodium ions (the salts of which are generally difficult to precipitate) accumulated on the resin with the calcium and magnesium ions (the salts of which are generally precipitable and responsible for water hardness) contained in the water to be treated. When the resin is saturated, it is necessary to regenerate the resin. Otherwise, the membrane will become fouled very rapidly.

In the reverse osmosis system, it is normal practice to send the concentrate to the sewer. On occasion, it may be recirculated once, but then must be disposed of to prevent fouling of the membrane. Naturally, this results in a substantial waste of water.

Every so often, the membrane must be cleaned. While this cleaning is normal and done on a regular basis, each cleaning reduces the efficiency of the membrane. Accordingly, the number of cleanings will dictate the timing for replacement of the membrane and the cost associated therewith.

A further problem which is encountered in reverse osmosis and particularly for industries which require a high purity water such as in the pharmaceutical industry, is that some of the treatments themselves render the permeate unsuitable for direct use. Thus, the use of water softeners merely replaces the calcium ion with the sodium ion which then passes through the membrane. Accordingly, one must then use a deionization (DI) to remove the sodium ion. Problems with respect to contamination also arise when the membrane is subjected to an acid clean or with the use of biocides.

SUMMARY OF THE INVENTION

It is an object of the present invention to provide a water treatment system wherein fouling of the reverse osmosis membrane is reduced.

It is a further object of the present invention to provide improvements in water treatment methods and systems wherein the crystal morphology of a precipitate is changed.

It is a further object of the present invention to provide methods for the treatment of water in a reverse osmosis system which is more efficient than present methods.

According to one aspect of the present invention, there is provided a water treatment system comprising a reverse osmosis device having a fluid inlet, a permeate outlet, and a concentrate outlet, pump means operative to pump a fluid through the reverse osmosis device, catalytic treatment means situated upstream of the fluid inlet, the catalytic treatment means comprising magnetic field generating means to create magnetic lines of flux and means for directing water fluid in a direction through the lines of flux to thereby cut the magnetic lines of flux at an angle, and filter means arranged to filter fluid from the concentrate outlet prior to recycling the fluid upstream of the catalytic treatment means.

In greater detail, the method and system of the present invention are designed to control the problems of membrane fouling of reverse osmosis devices. The invention may be utilized in any number of different applications wherein there are provided reverse osmosis devices—i.e. either in industrial or residential situations.

The present invention can and preferably operates in at least a partially closed loop system. By this, it is understood that the fluid, after undergoing the reverse osmosis process, is recirculated in the system. There may be various hybrids of closed loop systems in that there is usually a discharge to drain at some point and it will be understood that the term "closed loop system" includes all such systems.

According to the present invention, the water undergoes a magnetic treatment exposure in an anti-fouling catalyzer prior to entering the reverse osmosis device. The magnetic catalyzer or treatment consists of providing a magnetic field having magnetic lines or flux at a desired density. Conveniently, permanent magnets are utilized and the water is exposed to the magnetic field as discussed hereinbelow.

Various parameters in the application of the magnetic field can be varied. For example, one may vary the number of magnetic fields generated, the flux density, the total magnetic flux lines, the flow rate of the water, and the angle at which the direction of flow of the water cuts the magnetic lines of flux.

Generally, in one preferred aspect of the invention, the flux density will range between 1,200 gauss and 1,500 gauss although this may be increased or decreased depending upon other operational parameters. The total number of magnetic lines of flux desirably will range between 4,000 to 20,000 although, again, this may be varied depending upon other operating parameters. Ideally, the intersection of the direction of flow of the water and the direction of magnetic flux lines would be 90°. Since this is often not achievable considering other operational parameters, it becomes desirable to at least have as large an angle as possible (greater than 60°) between the directions of the water flow and magnetic lines of flux.

The water or other fluid may be exposed to a signal magnetic field or alternatively, it may be exposed to a plurality of such magnetic fields. Preferably, the water will pass through these two magnetic fields.

The magnetic catalyzer can be designed such that the water flows in a spiral configuration to thus be exposed at the desired angle to the lines of flux. Such treatment devices are known in the art and can be, for example, the device marketed under the trademark "MAG-O-PURE".

Following the catalytic treatment, the fluid may then be fed to the reverse osmosis device by means of a suitable pressure pump. Upon passing into the reverse osmosis system, the water which has been catalyzed has a different crystal structure and also less tendency to foul the membrane (attached pictures).

The water treatment system of the present invention may be utilized in different configurations. Thus, the system will include a filtering system for removal of the larger particles prior to passing through to the reverse osmosis device. One may utilize this pre-filtering system when recycling from the concentrate or alternatively, one may utilize a different filter set up prior to recycling the concentrate.

The system and method of the present invention are designed to work in a reverse osmosis device which operates at a relatively low temperature. The present invention changes the structure of the calcium carbonate. It may be defined as a catalytic treatment since it changes the speed of crystallization of the calcium carbonate.

Utilizing the present invention, one is able to recirculate the concentrate to a far greater degree than would otherwise be the case. Thus, in a normal reverse osmosis device, the concentrate must be carefully monitored otherwise fouling of the membrane will occur. As will be appreciated, when the calcium carbonate is deposited as calcite, it becomes extremely difficult to remove from the membrane. However, with the treatment of the present invention, the grain size of the deposit, which precipitates mostly as aragonite, increases. It is interesting to note that it is a plurality of passes by means of recycling which provides the morphological change as generally, a single exposure is not sufficient to cause such a morphological change.

Generally, the operation of the present invention will be carried out at a temperature of between 2° C. and 65° C. and more preferably, at a temperature of between 16° C. and 27° C.

BRIEF DESCRIPTION OF THE DRAWINGS

Having thus generally described the invention, reference will be made to the accompanying drawings illustrating embodiments thereof, in which.

DESCRIPTION OF THE PREFERRED EMBODIMENTS

Figure 1:
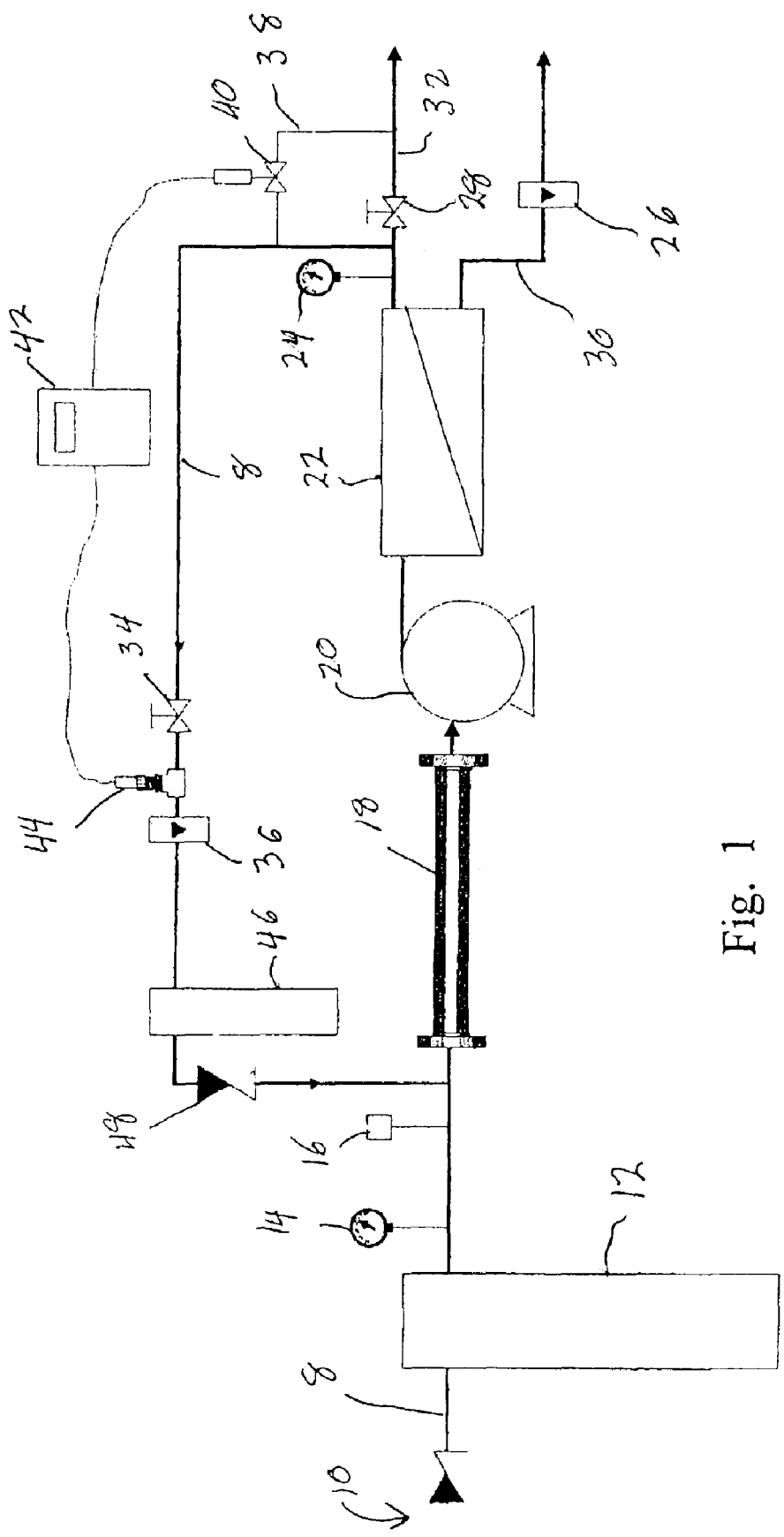
FIG. 1 is a schematic illustration of a first water treatment system according to the present invention.

Referring to the drawings in greater detail and by reference characters thereto, there is illustrated in FIG. 1 a first type of water treatment system. Conduits 8 are provided for fluid passage through the various components of the water treatment system.

Provided at the inlet to the water treatment system there is an inlet check valve 10 following which the fluid will pass through a filter generally designated by reference numeral 12. Subsequently, on the outlet side of filter 12, there is provided a pressure gauge 14 and a pressure switch 16.

The filtered water will then enter the anti-fouling catalyzer generally designated by reference numeral 18 wherein it is subjected to a magnetic field. The anti-fouling catalyzer 18 magnetically treats or conditions the fluid by providing a magnetic field having magnetic lines of flux which intersect the direction of water flow at an angle greater than 60°.

After exiting the anti-fouling catalyzer 18, the fluid passes through a pressure pump 20 from where it is fed to a reverse osmosis device generally designated by reference numeral 22. Reverse osmosis device 22 may be any conventional known in the art.

As is conventional, reverse osmosis device 22 includes a permeate outlet line 30 and a concentrate outlet line 32. On permeate outlet line 30, there is provided a flow meter 26 while on concentrate outlet line 32 there is provided a pressure gauge 24 and a control valve 28 for discharge of the concentrate when desired.

Conduit 8 is connected to concentrate outlet line 32 for recycling the output therefrom back to the inlet. On the recycle conduit, there is provided a control valve 34 and a flow meter 36.

There is also provided a blowdown line 38 and to this end, there is provided a blowdown solenoid valve 40 thereon. This is operatively connected to a ion concentration controller 42 which in turn receives input from an ion probe 44. Thus, the blowdown solenoid valve 40 may be open when a reading from ion probe 44 is in excess of that desired. Alternatively, instead of using an ion probe 44 and ion concentration controller 42, a timer operative to open solenoid valve 40 at appropriate intervals may be utilized. As may be seen in FIG. 1, a filter 46 may be placed on recycle line prior to the concentrate being fed upstream of anti-fouling catalyzer 18.

Figure 2:
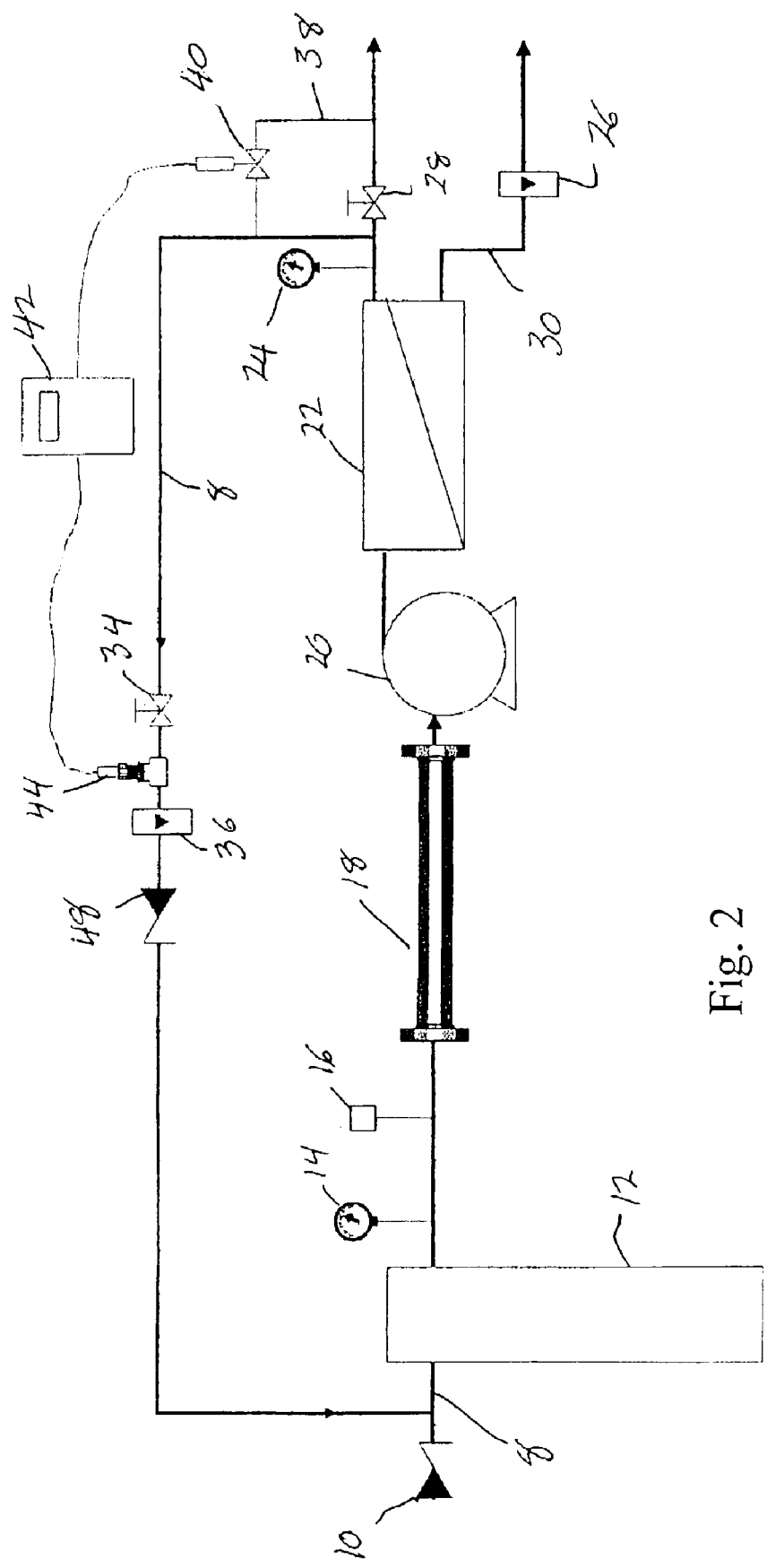
FIG. 2 is a schematic view of a second type of a water treatment system according to the present invention.

A somewhat modified version of the present invention is illustrated in FIG. 2 and reference will now be made thereto. Similar reference numerals are utilized for similar components.

The essential difference between the embodiments of FIGS. 1 and 2 is that a separate filter 46 is not employed. Rather, the recycle line is arranged such that the concentrate is fed back upstream of filter 12.

Figure 3:
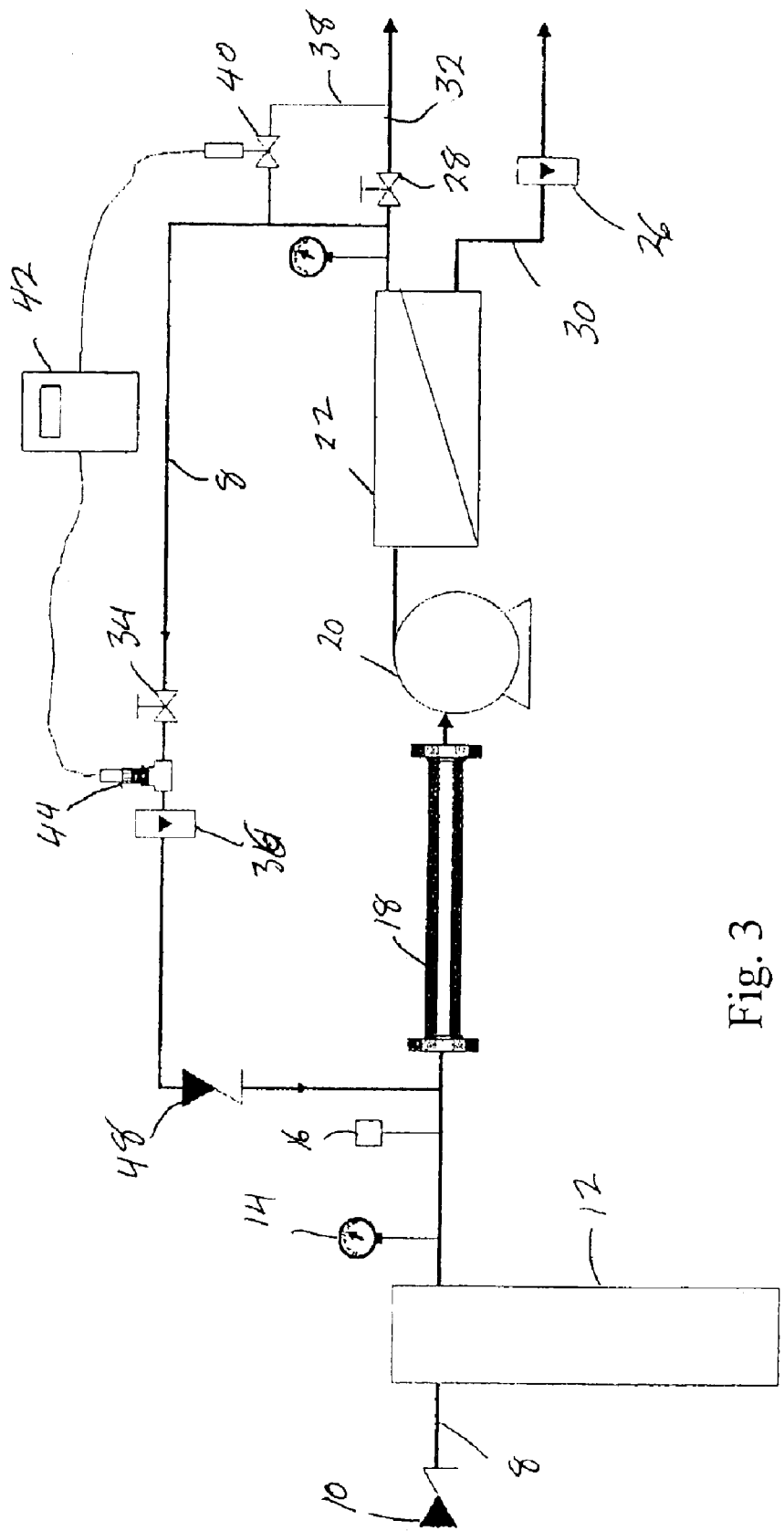
FIG. 3 is a schematic view of a still further type of water treatment system according to the present invention.

In the embodiment of FIG. 3, again similar reference numerals are employed for similar components. This arrangement is identical to that of FIG. 1 except that filter 46 is removed.

Figure 4:
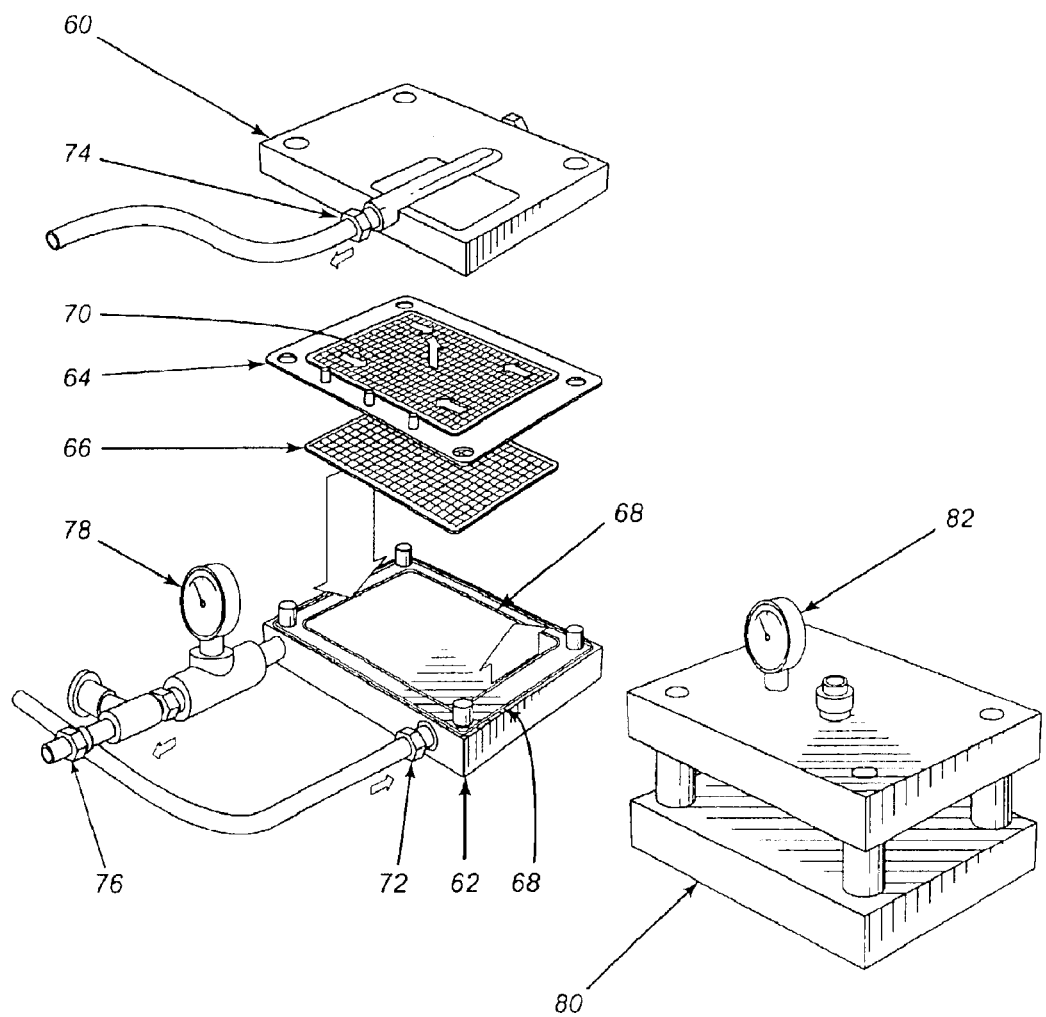
FIG. 4 is a perspective view of a testing apparatus used to illustrate the present invention.
Figure 5:
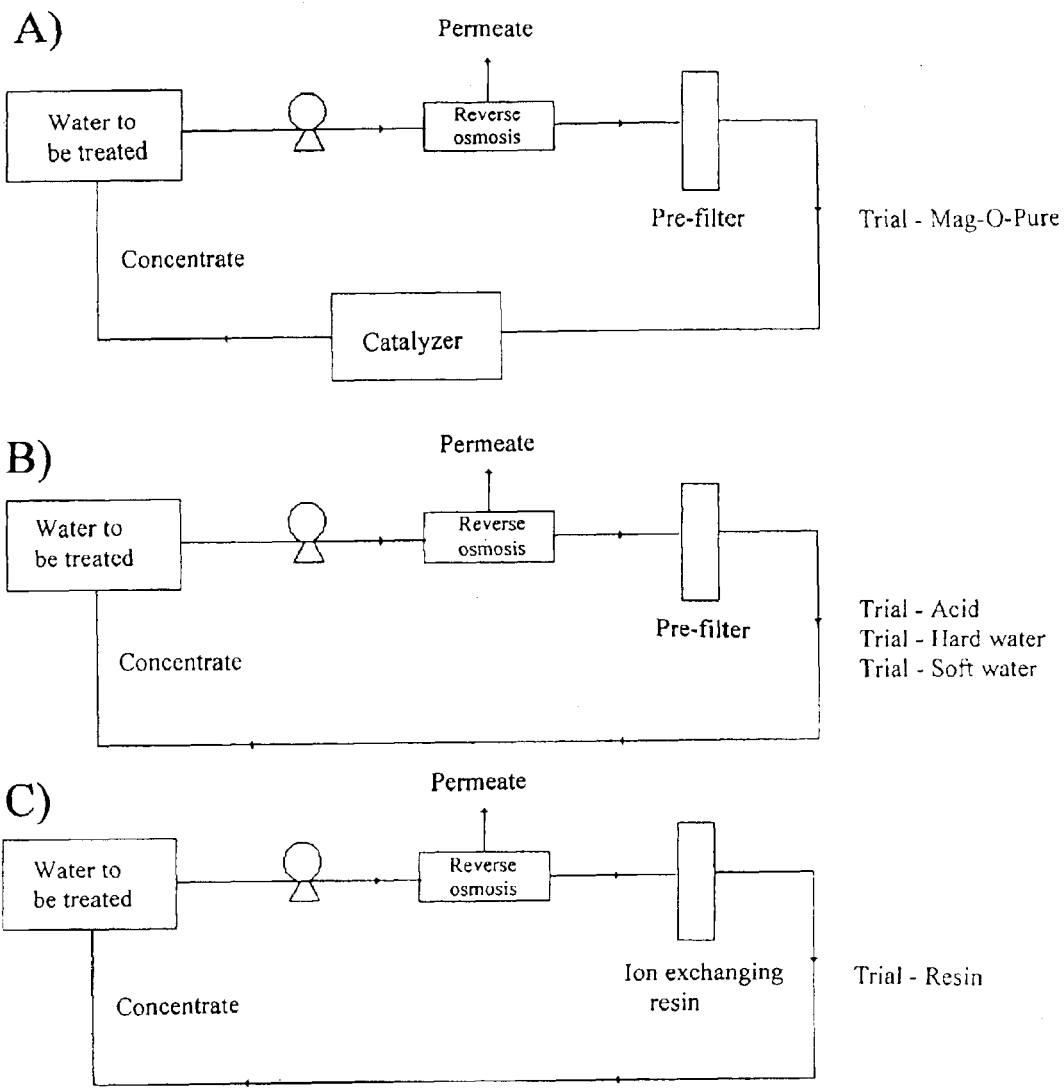
FIGS. 5A, 5B and 5C illustrate the test configurations.
Figure 6:
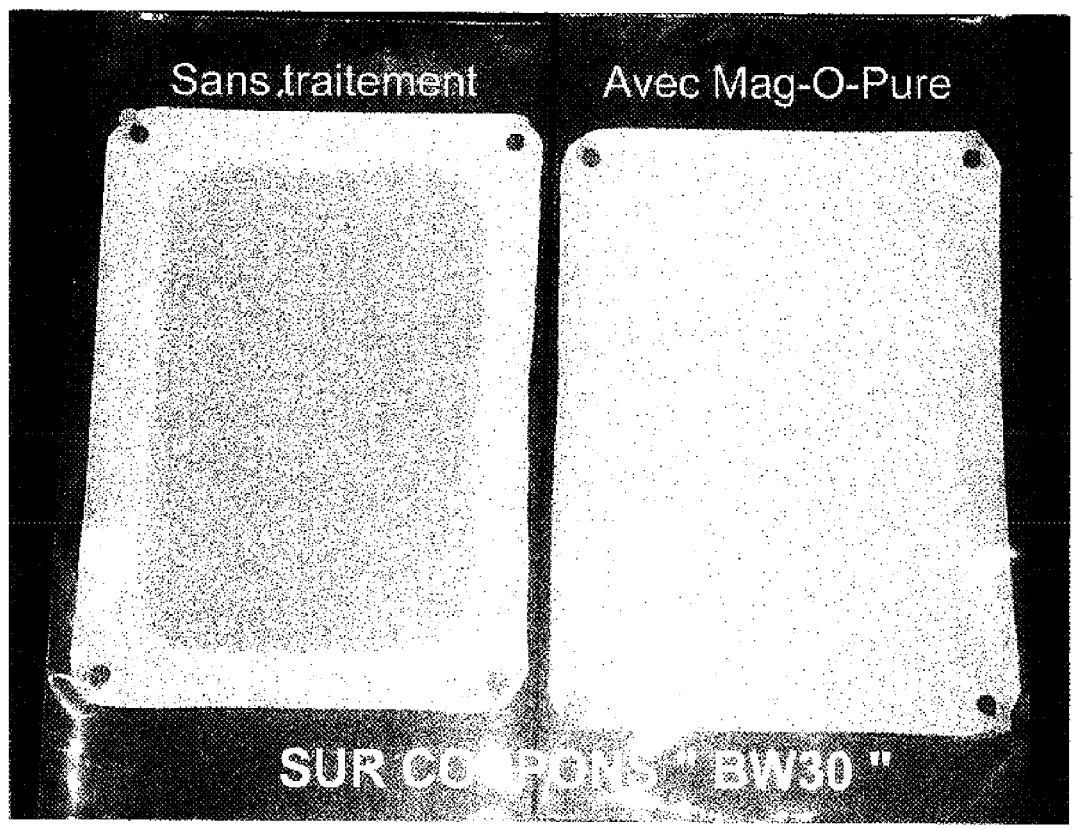
FIG. 6 is a photograph of a membrane having deposits thereon, one portion showing the membrane without the catalytic treatment of the present invention with the right hand side showing the membrane when used in a water treatment system using the present invention, the membrane being of the polyamide type.
Figure 7:
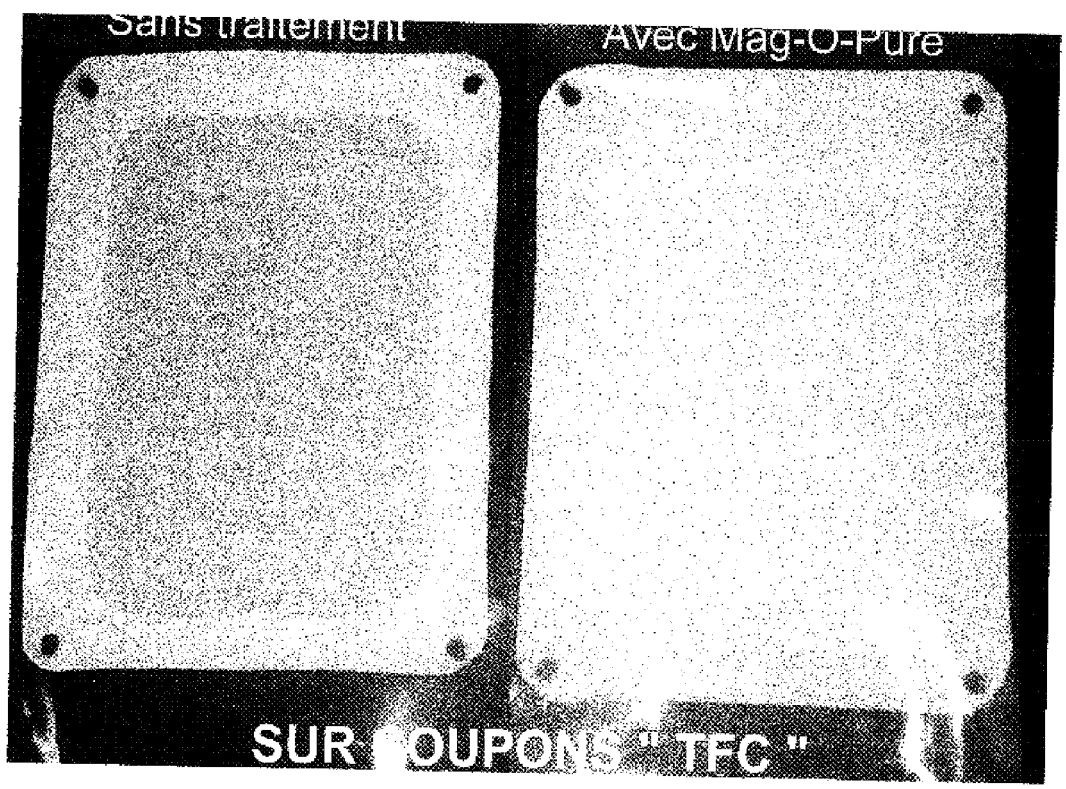
FIG. 7 is a photograph similar to FIG. 6, but with the membrane being of the TFC type.

Various tests were conducted using the set up shown in FIGS. 4 and 5. In this respect, there is shown a reverse osmosis assembly which comprises a cell body top 60 and a cell body bottom 62. Intermediate of top 60 and bottom 62 is a membrane 64 and a feed spacer (mesh spacer shown) 66. O-rings 68 are provided for sealing while on top of membrane 64 there is a permeate carrier 70. The water to be treated is fed through feed inlet 72 and there is provided a permeate outlet 74 and a concentrate outlet 76 having a concentrate pressure gauge 78 mounted thereon. The cell body is placed within a cell holder 80 and having a cell holder pressure gauge 82 associated therewith.

The tests were conducted in accordance with the set up shown in FIGS. 5A, 5B and 5C. In this respect, the set up of FIG. 5A is utilizing the catalytic treatment and device of the present invention while in FIG. 5B, this set up was used when using acidification and also when just using straight hard water and straight soft water. FIG. 5C shows the set up when the ion resin exchange system is utilized.

Annotations: If: Initial feeding
Pc: Permeate composite
Fc: Final concentrate

TABLE 1

Characteristics of the feeding water, the permeate and the concentrate in all the experiences conducted with the TFC S membrane.

| | Fe(ppm) | Mn(ppm) | Mg(ppm) | Ca(ppm) | Na(ppm) |
|---|---|---|---|---|---|
| Soft water If | 0.02 | 0 | 0.48 | 2.02 | 1.43 |
| Soft water Pc | 0 | 0 | 0 | 0 | 0 |
| Soft water Fc | 0.03 | 0 | 2.10 | 8.02 | 5.31 |
| Hard water If | 0.86 | 1.78 | 12.17 | 40.09 | 42.03 |
| Hard water Pc | 0 | 0.02 | 0.19 | 0.29 | 3.44 |
| Hard water Fc | 0 | 5.25 | 48.16 | 144.34 | 150.13 |
| HW + Magopure If | 1.7 | 1.74 | 12.24 | 37.55 | 41.73 |
| HW + Magopure Pc | 0 | 0.09 | 0.8 | 1.88 | 5.06 |
| HW + Magopure Fc | 0 | 4.68 | 48.52 | 136.63 | 138.07 |
| HW + Resin If | 0.55 | 1.81 | 12.55 | 39.26 | 42.11 |
| HW + Resin Pc | 0 | 0 | 0 | 0 | 5.55 |
| HW + Resin Fc | 0.52 | 0.01 | 0 | 0 | 465.04 |

| | Cond(us) | pH | Sulfate(ppm) | Carbonate | Hardness(ppm) |
|---|---|---|---|---|---|
| HW + Acid If | 1.08 | 1.82 | 12.94 | 39.37 | 43.12 |
| HW + Acid Pc | 0 | 0.26 | 1.5 | 4.9 | 12.094 |
| HW + Acid Fc | 0.87 | 5.79 | 42.46 | 128.86 | 119.86 |
| Soft water If | 26.2 | 6.54 | — | — | 7.02 |
| Soft water Pc | 2 | 7.41 | 0 | 0 | 0 |
| Soft water Fc | 85.9 | 6.79 | 19 | 19.1 | 28.67 |
| Hard water If | 474 | 7.69 | 34 | 241 | 150.22 |
| Hard water Pc | 23 | 8.21 | 0 | 0 | 1.51 |
| Hard water Fc | 1419 | 8.69 | 134 | 987 | 558.74 |
| HW + Magopure If | 497 | 7.08 | 35 | 241 | 144.17 |
| HW + Magopure Pc | 56 | 6.76 | 0 | 0 | 7.99 |
| HW + Magopure Fc | 1208 | 8.45 | 130 | 804 | 540.97 |
| HW + Resin If | 478 | 7.04 | 35 | 250 | 149.71 |
| HW + Resin Pc | 24 | 8.55 | 0 | 0 | 0 |
| HW + Resin Fc | 1593 | 8.68 | 146 | 1135 | 0 |
| HW + Acid If | 1051 | 2.99 | 27 | N/A | 151.59 |
| HW + Acid Pc | 423 | 3.07 | 0 | 0 | 18.41 |
| HW + Acid Fc | 1674 | 3.12 | 106 | N/A | 496.61 |

TABLE 2

Summary tables of the reduction of the parameters for the permeate.

| | Fe(ppm) | Mn(ppm) | Mg(ppm) | Ca(ppm) | Na(ppm) |
|---|---|---|---|---|---|
| Soft water | 100% | 100% | 100% | 100% | 100% |
| Hard water | 100% | 98.9% | 98.4% | 99.3% | 91.8% |
| HW + Magopure | 100% | 94.8% | 93.5% | 95% | 87.9% |
| HW + Resin | 100% | 100% | 100% | 100% | 86.8% |
| HW + Acid | 100% | 84.7% | 88.4% | 87.5% | 72% |

TABLE 2-continued

Summary tables of the reduction of the parameters for the permeate.

| | Fe(ppm) | Mn(ppm) | Mg(ppm) | Ca(ppm) | Na(ppm) |
|---|---|---|---|---|---|
| Soft water | 92.4% | — | 100% | 100% | 100% |
| Hard water | 95.2% | — | 100% | 100% | 99.0% |
| HW + Magopure | 88.7% | — | 100% | 100% | 94.5% |
| HW + Resin | 95.2% | — | 100% | 100% | 100% |
| HW + Acid | 59.8% | — | 100% | 100% | 87.9% |

TABLE 3

Characteristics of the feeding water, the permeate and the concentrate in all the experiences conducted with the BW30 membrane.

| | Fe(ppm) | Mn(ppm) | Mg(ppm) | Ca(ppm) | Na(ppm) |
|---|---|---|---|---|---|
| Soft water If | 0.02 | 0 | 0.49 | 2.08 | 1.02 |
| Soft water Pc | 0 | 0 | 0 | 0 | 0 |
| Soft water Fc | 0.07 | 0 | 2.22 | 7.19 | 8.08 |
| Hard water If | 0.46 | 1.79 | 12.68 | 42.55 | 45.4 |
| Hard water Pc | 0 | 0.01 | 0.1 | 0 | 1.2 |
| Hard water Fc | 0 | 0.36 | 58.89 | 90.27 | 185.7 |
| HW + Magopure If | 1.24 | 1.86 | 13.01 | 42.79 | 55.7 |
| HW + Magopure Pc | 0 | 0.01 | 0.15 | 0 | 1.7 |
| HW + Magopure Fc | 0 | 0.35 | 55 | 86.45 | 193.0 |
| HW + Resin If | 0.18 | 1.82 | 10.01 | 41.95 | 46.3 |

TABLE 3-continued

Characteristics of the feeding water, the permeate and the concentrate in all the experiences conducted with the BW30 membrane.

| | | | | | |
|---|---|---|---|---|---|
| HW + Resin Pc | 0 | 0 | 0 | 0 | 1.0 |
| HW + Resin Fc | 0.32 | 0.01 | 0 | 0 | 559.6 |
| HW + Acid If | 0.15 | 1.89 | 13.23 | 42.86 | 46.3 |
| HW + Acid Pc | 0 | 0.12 | 0 | 2.37 | 2.9 |
| HW + Acid Fc | 0.95 | 7.01 | 52.36 | 162.52 | 172.2 |

| | Cond(us) | pH | Sulfate(ppm) | Carbonate | Hardness(ppm) |
|---|---|---|---|---|---|
| Soft water If | 26.6 | 6.46 | — | — | 7.2 |
| Soft water Pc | 1.7 | 7.41 | 0 | 0 | 0 |
| Soft water Fc | 92.8 | 6.79 | 21 | 15.8 | 27.1 |
| Hard water If | 401 | 7.98 | 33 | 254 | 158.5 |
| Hard water Pc | 6.2 | 8.78 | 0 | 0 | 0.4 |
| Hard water Fc | 1202 | 8.06 | 148 | 790 | 467.9 |
| HW + Magopure If | 443 | 7.87 | 36 | 257 | 160.4 |
| HW + Magopure Pc | 9.9 | 7.5 | 0 | 0 | 0.6 |
| HW + Magopure Fc | 1209 | 8.1 | 140 | 706 | 442.4 |
| HW + Resin If | 402 | 7.66 | 35 | 264 | 146 |
| HW + Resin Pc | 5.1 | 8.49 | 0 | 0 | 0 |
| HW + Resin Fc | 1708 | 8.85 | 160 | 1111 | 0 |
| HW + Acid If | 738 | 2.98 | 28 | 106 | 161.5 |
| HW + Acid Pc | 258 | 3.13 | 0 | 0 | 5.9 |
| HW + Acid Fc | 1689 | 4.33 | 115 | N/A | 621.4 |

TABLE 4

Summary tables of the reduction of the parameters for the permeate.

| | Fe(ppm) | Mn(ppm) | Mg(ppm) | Ca(ppm) | Na(ppm) |
|---|---|---|---|---|---|
| Soft water | 100% | 100% | 100% | 100% | 100% |
| Hard water | 100% | 99.4% | 99.2% | 100% | 97.4% |
| HW + Magopure | 100% | 99.5% | 98.9% | 100% | 97.0% |
| HW + Resin | 100% | 100% | 100% | 100% | 97.8% |
| HW + Acid | 100% | 93.7% | 100% | 94.5% | 93.7% |

| | Cond(us) | pH | Sulfate(ppm) | Carbonate | Hardness(ppm) |
|---|---|---|---|---|---|
| Soft water | 93.4% | — | 100% | 100% | 100% |
| Hard water | 98.4% | — | 100% | 100% | 99.7% |
| HW + Magopure | 97.8% | — | 100% | 100% | 99.6% |
| HW + Softener | 98.7% | — | 100% | 100% | 100% |
| HW + Acid | 65.0% | — | 100% | 100% | 96.3% |

From the above, it will be seen that the magnetic treatment shows results wherein membrane fouling is reduced.

Figure 8:
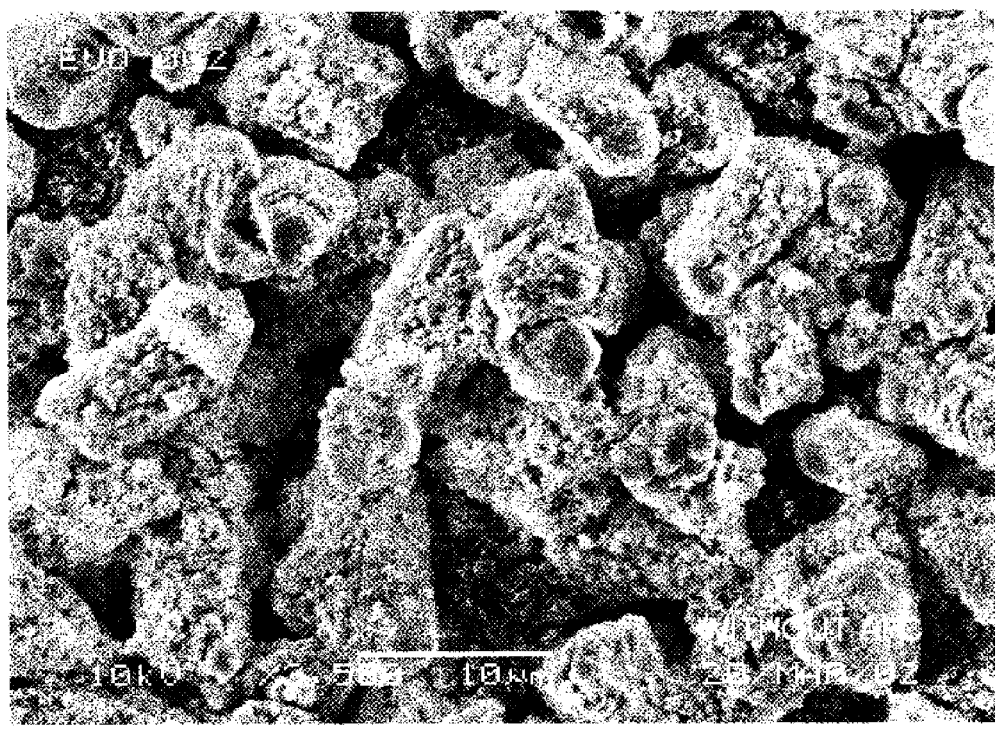
FIG. 8 is an enlarged view of the crystal structure of the deposit on the left hand side of FIG. 6.
Figure 9:
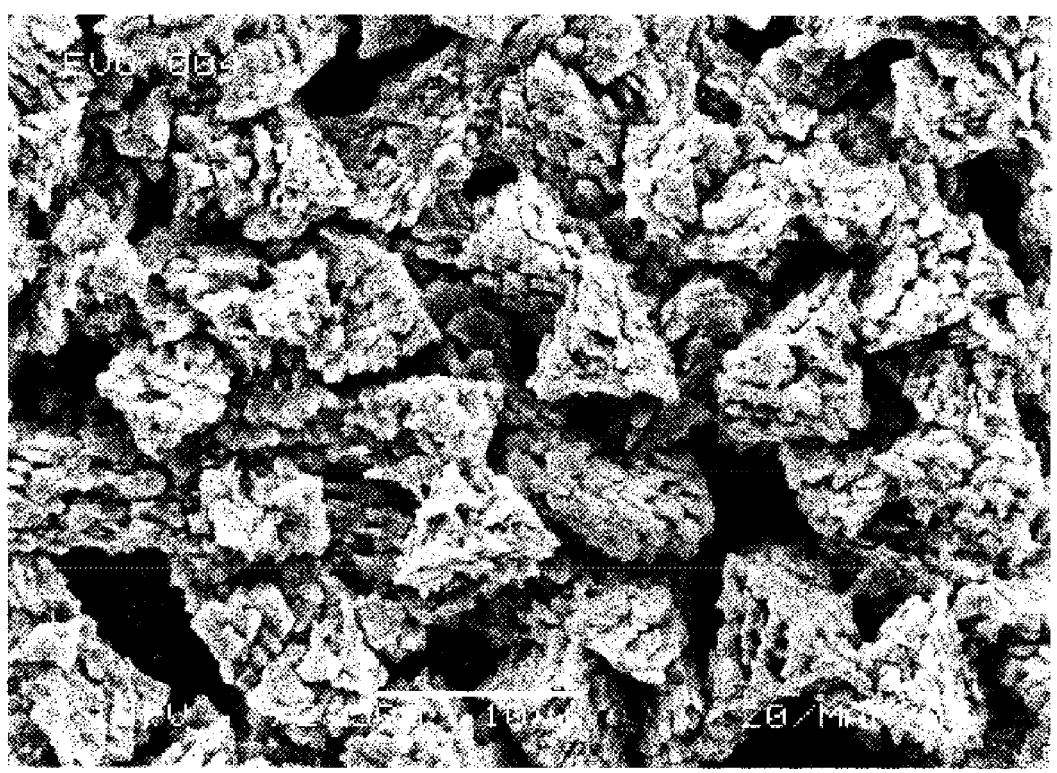
FIG. 9 is an enlarged view of the right hand side of FIG. 6.

The above is clearly shown in comparison between FIGS. 8 and 9 which show a difference in the crystal structure on a BW30 membrane. Thus, the crystals are larger, triangular in configuration, and tend to be more easily cleaned from the membrane.

Figure 10:
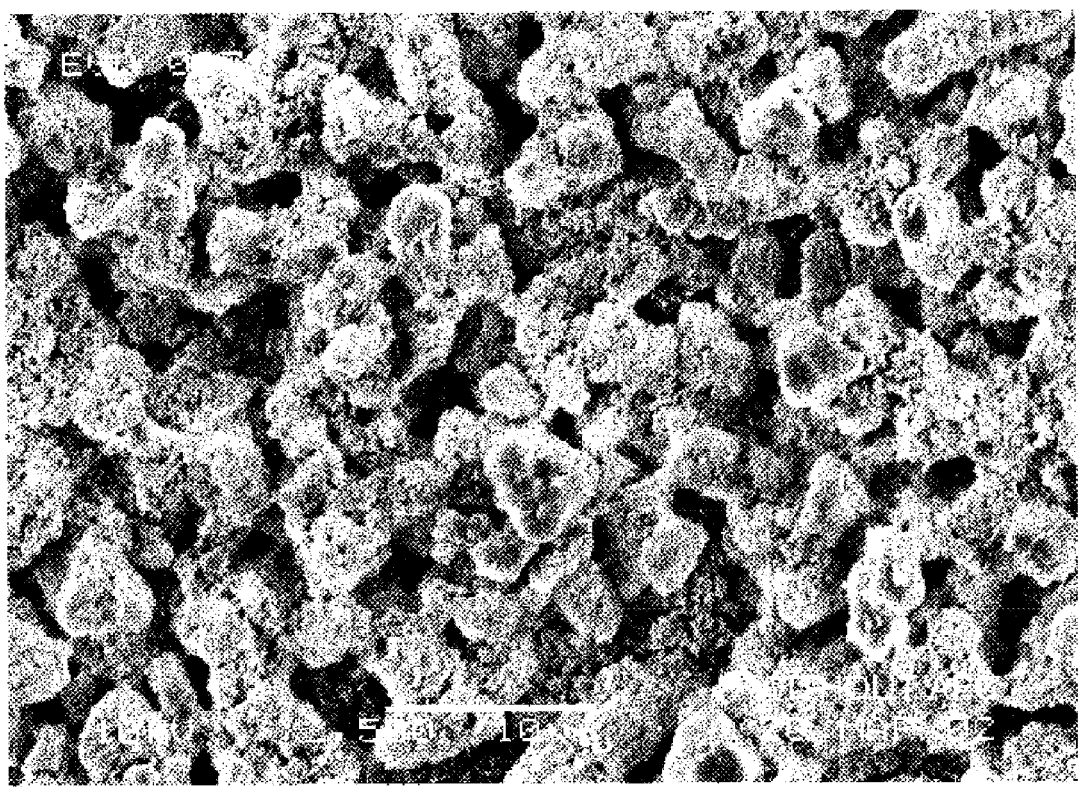
FIG. 10 is an enlarged view of the crystal structure of the deposit shown on the membrane on the left hand side of FIG. 7.
Figure 11:
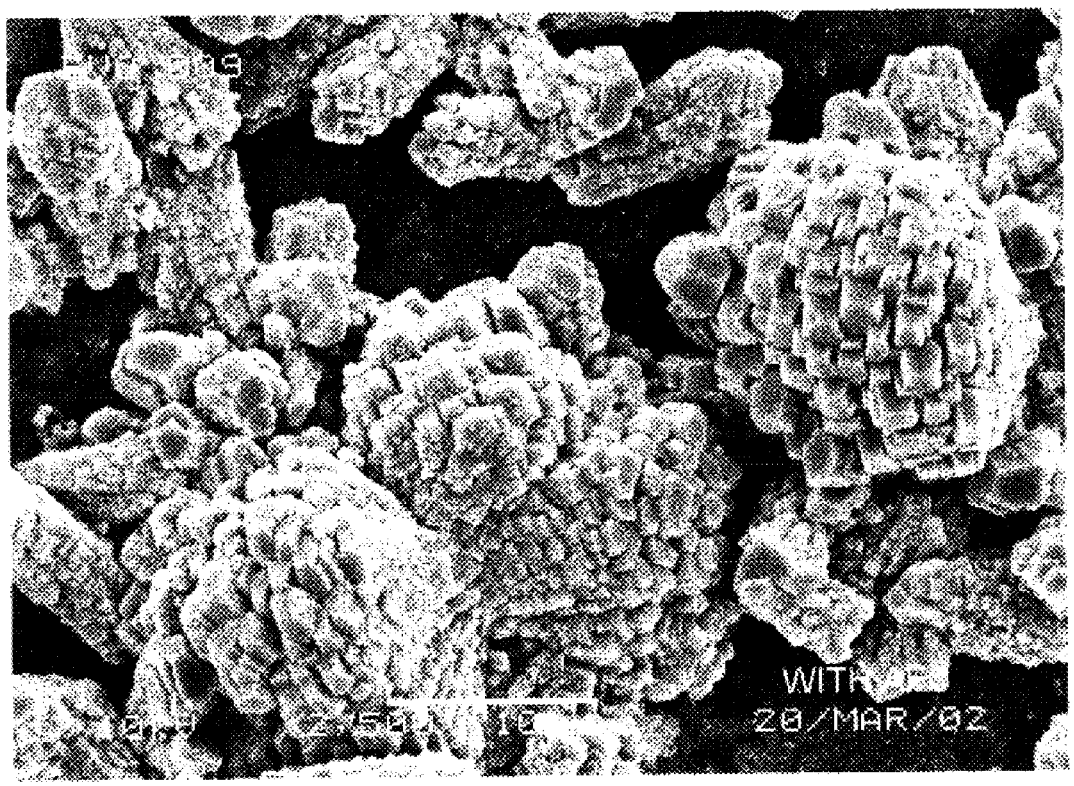
FIG. 11 is an enlarged view of the right hand side of FIG. 7.

A similar result is shown in the photographs of FIGS. 10 and 11 which are on a TFC membrane. It is interesting to note that on the TFC membrane, the crystals tend to form spherical crystals compared to the triangular crystals of the BW30. However, the results are similar in that substantially larger crystals are obtained rendering the same far easier to clean from the membrane.

It will be understood that the above described embodiments are for purposes of illustration only and that changes or modifications may be made thereto without departing from the spirit and scope of the invention.

I claim:

1. A water treatment system comprising:
    a reverse osmosis device having a fluid inlet, a permeate outlet, and a concentrate outlet;
    pump means operative to pump a fluid through said reverse osmosis device;
    magnetic treatment means situated upstream of said fluid inlet, said magnetic treatment means comprising magnetic field generating means to create magnetic lines of flux and means for directing water fluid in a direction through said lines of flux to thereby cut said magnetic lines of flux at an angle;
    a recycling line between said concentrate outlet and a point upstream of said magnetic treatment means, filter means arranged to filter fluid located upstream of said magnetic treatment means.

2. The system of claim 1 further including second filter means located on said recycling line.

3. The system of claim 2 further including an ion concentration controller located on said recycling line.

4. A method of modifying the crystal structure of a precipitate in a reverse osmosis process, the method comprising the step of passing a fluid through a magnetic treatment means and a reverse osmosis device, recycling a portion of a concentrate from said reverse osmosis device upstream of said magnetic treatment means and filtering said concentrate, prior to entry to said magnetic treatment means.

5. The method of claim 4 wherein the step of passing a fluid through a magnetic treatment means comprises the step of passing said fluid through said magnetic treatment means such that lines of flux cut said fluid at an angle.

* * * * *